(12) United States Patent
Hagelin

(10) Patent No.: US 6,318,871 B1
(45) Date of Patent: Nov. 20, 2001

(54) OPTICAL MIRROR SYSTEM WITH MULTI-AXIS ROTATIONAL CONTROL

(75) Inventor: Paul Merritt Hagelin, Saratoga, CA (US)

(73) Assignee: C Speed Corporation, Santa Clara, CA (US)

( * ) Notice: Subject to any disclaimer, the term of this patent is extended or adjusted under 35 U.S.C. 154(b) by 0 days.

(21) Appl. No.: 09/590,554

(22) Filed: Jun. 9, 2000

(51) Int. Cl.⁷ .................................................. G02B 7/182
(52) U.S. Cl. .................... 359/872; 359/871; 359/223; 359/224; 359/225
(58) Field of Search .............................. 359/872, 871, 359/223, 224, 225, 226, 291, 298

(56) References Cited

U.S. PATENT DOCUMENTS

| | | | |
|---|---|---|---|
| 5,408,069 | * 4/1995 | Mischel, Jr. | 219/219 |
| 5,438,235 | * 8/1995 | Sommerer et al. | 313/489 |
| 6,046,840 | * 4/2000 | Huibers | 359/291 |
| 6,072,617 | * 6/2000 | Henck | 359/237 |

\* cited by examiner

*Primary Examiner*—Mohammad Sikder
(74) *Attorney, Agent, or Firm*—Sawyer Law Group LLP

(57) ABSTRACT

An optical mirror system in accordance with the present invention is disclosed. The optical mirror system comprises a mirror frame and an optical surface coupled to the mirror frame. The mirror system further includes an electrostatic shield coupled to optical surface and the mirror frame and an electrode system for causing the optical surface to be rotated without being deformed. In operation, primary and secondary electrodes are utilized. Differential capacitive sensing may be used to reduce the noise in the sense signal. The mirror can be fabricated using standard surface-micromachining processes, and aside from one-time assembly operations, the device has no frictional wear.

7 Claims, 4 Drawing Sheets

OPTICAL MIRROR SYSTEM WITH MULTI-AXIS ROTATIONAL CONTROL

FIELD OF THE INVENTION

The present invention relates generally to a Microelectromechanical System (MEMS) fabricated optical mirror system that is capable of being tilted on two orthogonal axes by means of electrostatic actuation. Particular application to the use of these mirrors in the deflection of optical space beams is emphasized.

BACKGROUND OF THE INVENTION

Fiber optic communication systems currently employ switching systems to route signals at central office switching centers. These electro-optic systems rely on converting the light output from each "incoming" fiber into electrical form, extracting the data content in the resultant electrical signal, then utilizing conventional electrical switches to route the data content to a modulatable optical source that is coupled to a "destination" optical fiber. This detection, switching, and remodulation process is expensive, complex, power consuming, and subject to component failure.

Alternate "All Optical" switching systems, employing mechanically actuated bulk optic and MEMS fabricated devices, currently exist. These devices utilize electromagnetic, piezoelectric and electrostatic actuators to physically move prisms, mirrors and portions of optical fibers to affect switching of signals between optical fibers. In addition, fiber-to-fiber switches employing Grating Waveguides, Rowland Circle Gratings, and planar gratings, permit dedicated switching based on optical wavelength.

Cascaded binary tree configurations, employing switchable optical couplers using electrostatically variable index material, (Lithium Niobate and polymers), as well as Mach Zender interferometers utilizing thermoelectric heaters to affect unbalance, are also currently state of the art.

Many of the MEMS switches employ a space-beam deflection system similar to the electrical "Cross Bar" switch common in telephone system. This approach requires that the number of mirrors for a given input/output port count be determined by the square of the port count figure. The overwhelming number of mirrors dictated by this high port-count switching approach exceeds that which can be produced with any realistic process yield, and survive any reasonable operating period.

Except for some of the MEMS electrostatically actuated devices, none of the above methods of optical switching meets the requirements currently being specified for high fiber port count, (up to 1024 by 1024) Optical Cross Connect switches. Problems of cost, reliability, insertion loss, polarization sensitivity, isolation, wavelength dependence, power consumption, and in some instances, switching speed, either individually or collectively mitigate against their use. Accordingly, what is needed is a system and method for overcoming the above-identified issues under the constraint of a simple CMOS-compatible fabrication process.

An optical mirror system design is desired that has high-resolution 2-D scanning capability and deflection capability, made with a surface-micromachining process. In order to achieve high-resolution, large mirror size and rotation angles are necessary.

The present invention addresses such a need.

SUMMARY OF THE INVENTION

An optical mirror system in accordance with the present invention is disclosed. The optical mirror system comprises a mirror frame and an optical surface coupled to the mirror frame. The mirror system further includes an electrostatic shield coupled to optical surface and the mirror frame and an electrode system for causing the optical surface to be rotated without being deformed. In operation, primary and secondary electrodes are utilized. Differential capacitive sensing may be used to reduce the noise in the sense signal. The mirror can be fabricated using standard surface-micromachining processes, and aside from one-time assembly operations, the device has no frictional wear.

A device in accordance with the present invention meets the requirements for a directly scalable, high port count optical switch, utilizing a unique two mirror per optical I/O port configuration. An optical mirror in accordance with the present invention can be utilized in, but is not limited to, the following applications: optical add-drop multiplexers, wavelength routers, free-space optical interconnects, chip-level optical I/O, optical scanning displays, optical scanner (bar-codes, micro cameras), optical storage read/write heads, laser printers, medical replacement for glasses (incorporated with adaptive optics), medical diagnostic equipment, optical scanning for security applications. Integration of an optical scanning mirror with optical detectors can reduce the cost of imaging applications by reducing the number of detectors needed to capture 1-D or 2-D optical information.

BRIEF DESCRIPTION OF THE DRAWINGS

FIG. 1b illustrates a side view of FIG. 1a.

DETAILED DESCRIPTION

The present invention relates to an optical mirror and more particularly to an optical mirror system with a multi-axis rotational control. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1B:
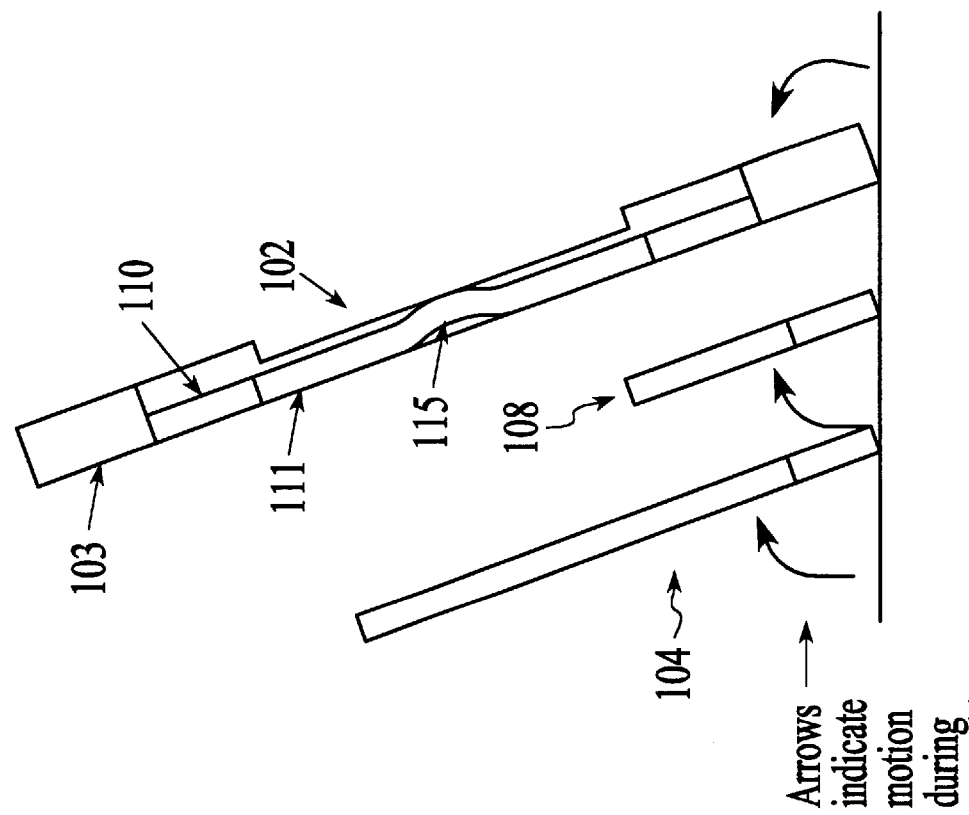
Figure 1A:
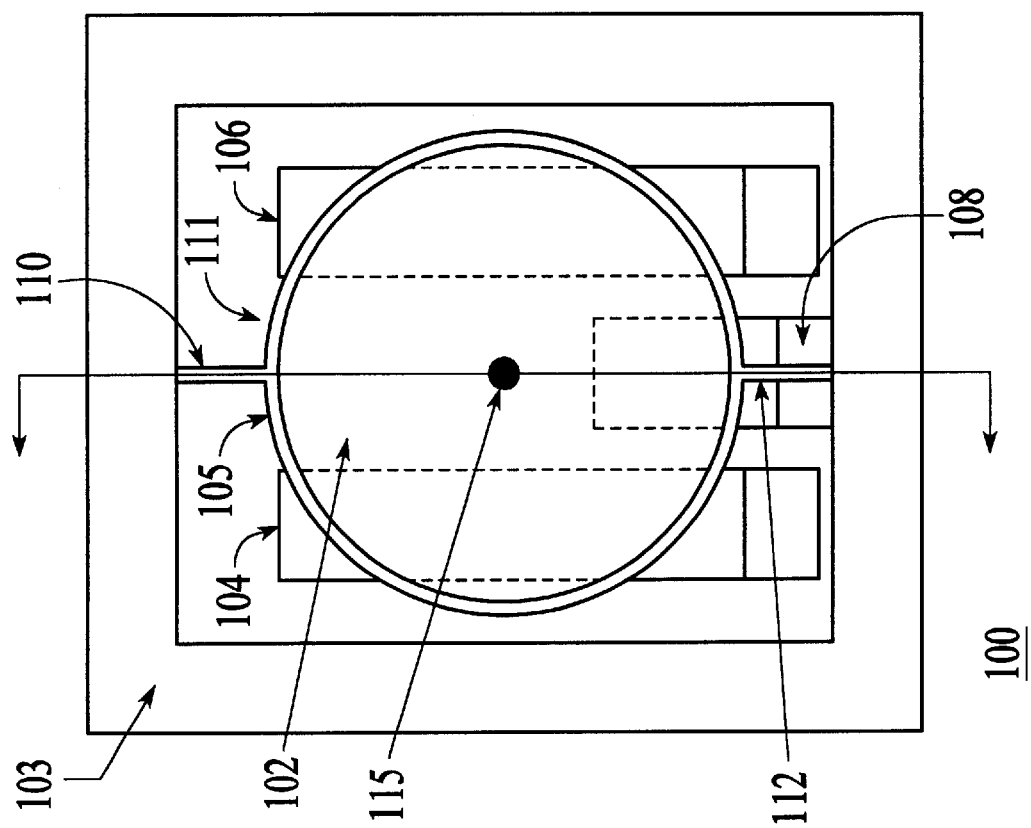
FIG. 1a illustrates a front view of the optical mirror system in accordance with the present invention.

FIG. 1a illustrates a front view of the optical mirror system 100 in accordance with the present invention. FIG. 1b illustrates a side view of FIG. 1a. An electrostatic shield 111 is coupled to the optical surface 102. In a preferred embodiment, a via 115 is utilized to couple the optical surface 102 of the mirror 100 to the shield 111. The electrostatic shield 111 is coupled to a mirror frame 103 by first and second suspension beams 110 and 112. First and second primary electrodes 104 and 106 are provided to rotate the mirror about its flexure beams based upon voltage signals being appropriately provided thereto. A secondary electrode 108 also provides for rotation. Through the use of this system, the shield 111 isolates the mirror surface from the bending due to the electrostatic fields created thereby and from the mechanical forces coupled through the support beams 110 and 112.

Electrostatic actuation is achieved with two primary electrodes 104 and 106 situated behind the optical surface of the mirror. The two primary electrodes 104 and 106 actuate the optical surface 102, attached by two flexure beams 110,112 to the supporting frame 103, about its primary rotational axis. Rotation about the secondary axis is achieved by bending of the torsion beams 110,112 by an electrostatic field controlled by secondary electrode 108. One or two electrodes can be used to rotate the mirror about the secondary axis.

By connecting the optical surface 102 to the support frame 103 with a via 115 at its center, the optical surface flatness is not affected by forces that develop in its suspension. In addition, if there is a stress gradient in the optical surface 102, the symmetric boundary conditions will typically result in a parabolic mirror shape, which can be readily integrated into an optical system using off-the-shelf spherical optics. Asymmetric boundary conditions can cause deformations in the optical surface 102 that can cause optical loss through a switch. Electrodes fabricated directly beneath the optical surface 102 need not be used, removing creases that can occur in the optical surface because of conformal deposition over the electrodes. Instead, hinged electrodes can be fabricated adjacent to the mirror and brought into close proximity of the mirror.

Figure 2A:
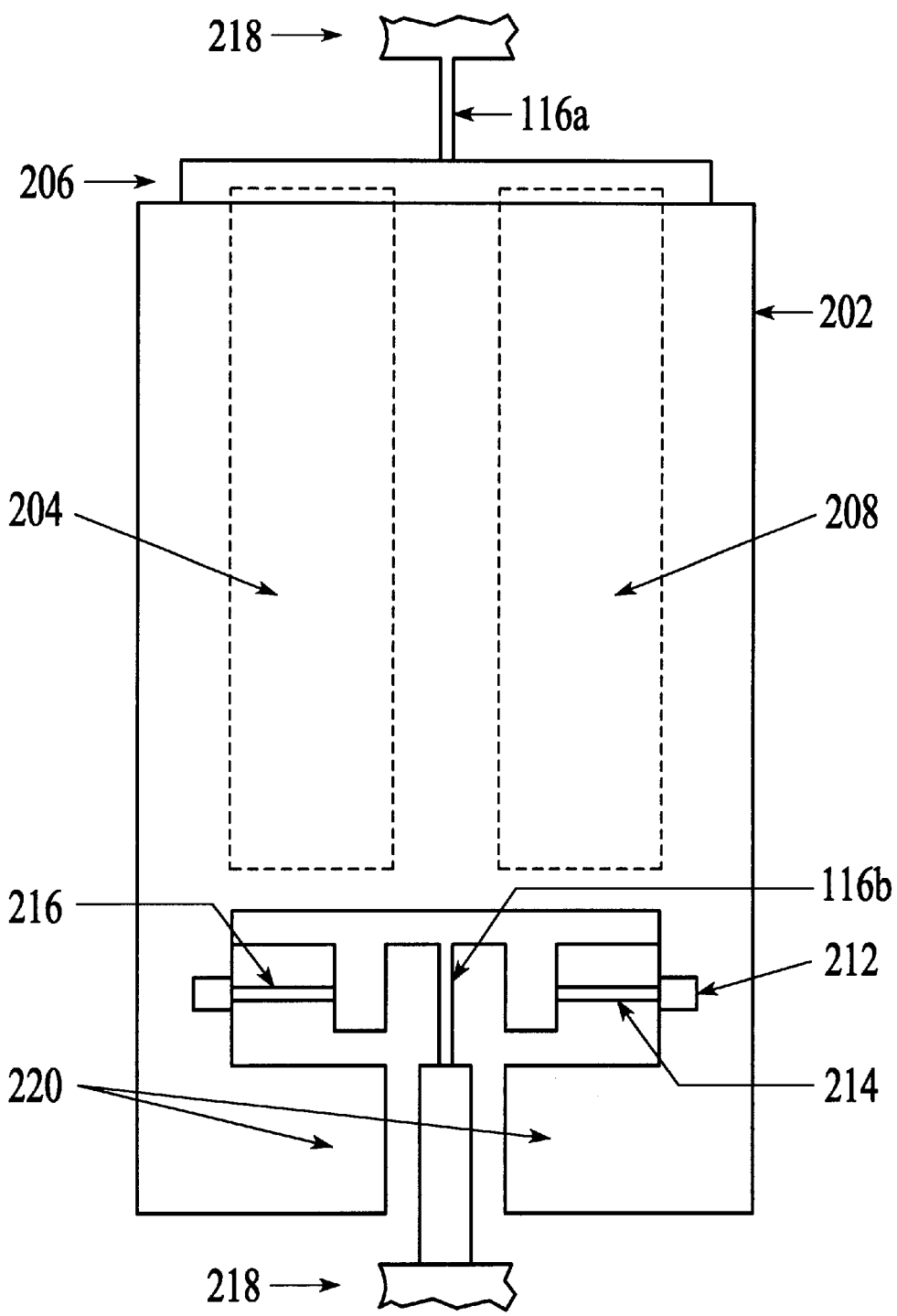
FIG. 2a illustrates a layout of a second embodiment of a front view of a mirror in accordance with the present invention.
Figure 2B:
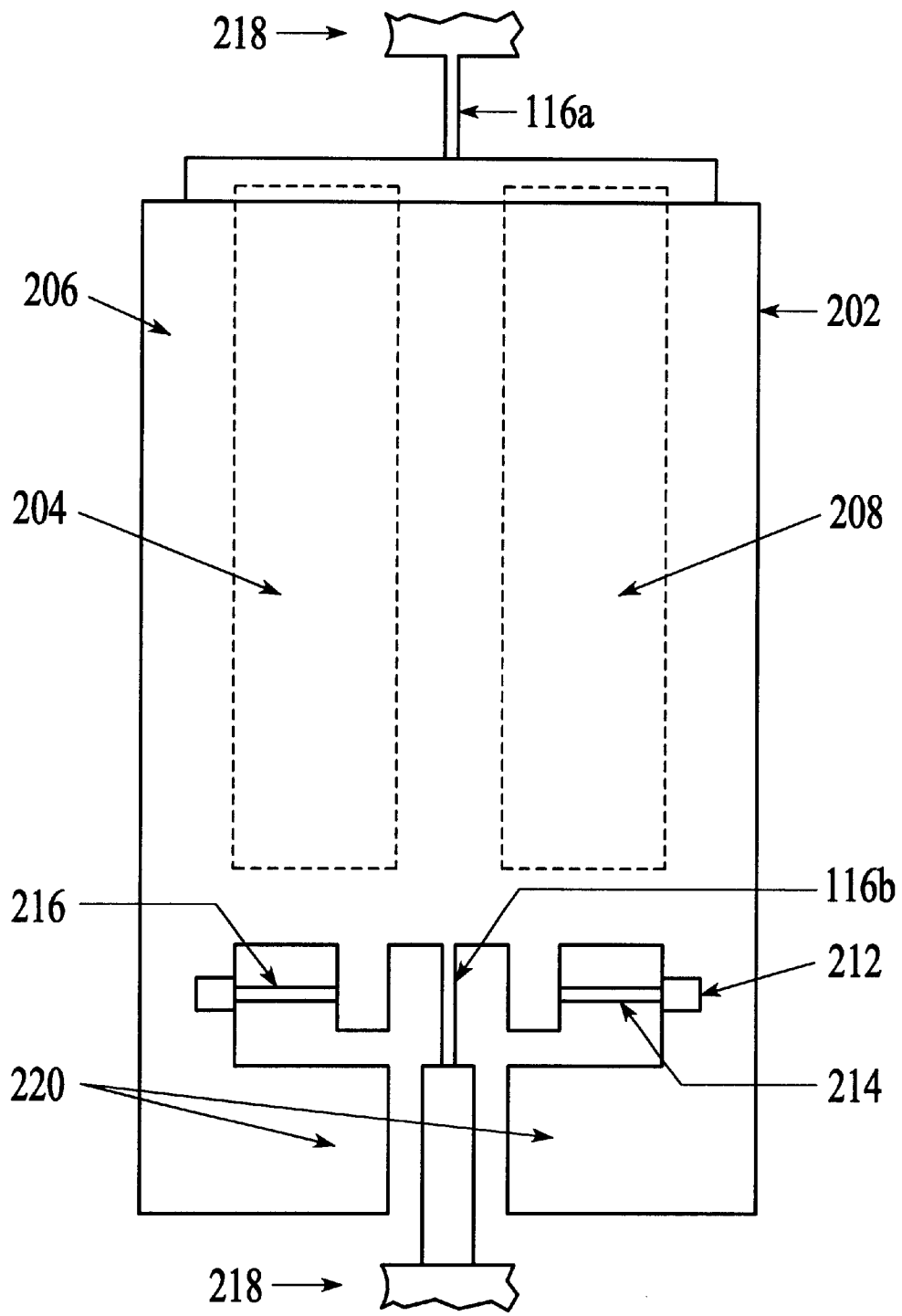
FIG. 2b illustrates a back view of the mirror of FIG. 2a. (NOTE: I have changed FIG. 2b. It was identical to FIG. 2a)
Figure 2C:
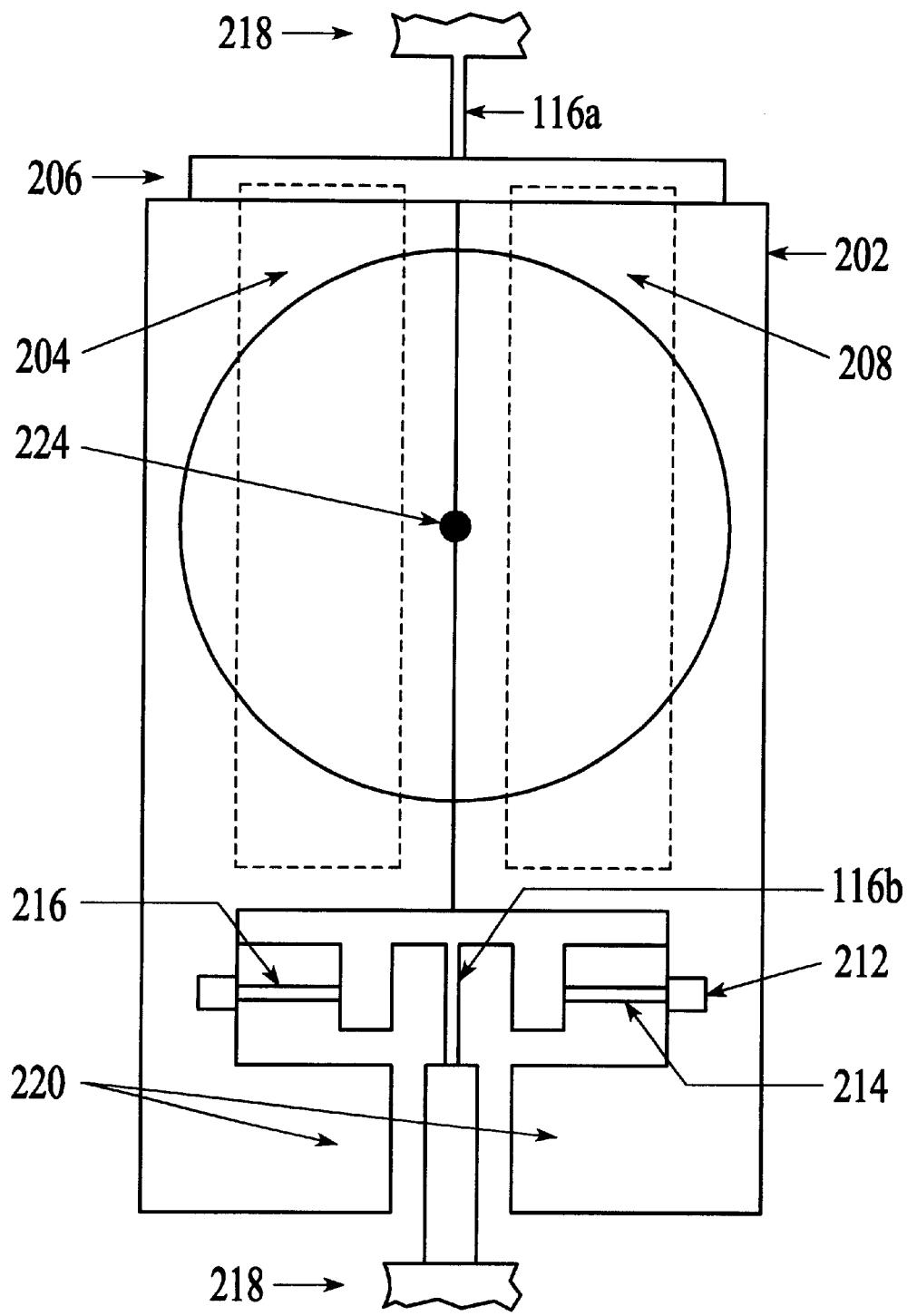
FIG. 2c illustrates a front view of the mirror of FIG. 2a, with a modified optical surface having symmetric boundary conditions.

FIG. 2a illustrates a layout of a second embodiment of a front view of a mirror 200 in accordance with the present invention. FIG. 2b illustrates a back view of the mirror 200 of FIG. 2a. FIG. 2c illustrates the front view of FIG. 2a, having an optical surface with symmetric boundary conditions. This embodiment has many of the same features as the first embodiment.

In this embodiment, a second pair of torsional beams 214 and 216 increases the angular motion range about the secondary axis. The optical surface 202 of the mirror 200 is attached through two torsion beams 214 and 216 to an electrostatic shield 206 (NOTE I have changed the arrow on 206). The electrostatic shield 206 is coupled to an outer support frame 218 (NOTE 121 changed to 218 on FIG. 2a) with two torsion beams 116a and 116b, which are preferably collinear with the primary rotation axis. There are two primary electrodes 204 and 208 and two secondary electrodes 220. The outline of the electrode positions are shown in FIGS. 2a and 2b. This double-gimbaled arrangement facilitates more movement on the secondary axis. The electrodes are electrically isolated from the mirror but are in close proximity to facilitate low-voltage electrostatic actuation. The mirror shown in FIGS. 2a and 2b is shielded from electrostatic forces of the actuators and mechanical forces of the suspension beams 116a and 116, but it does not have symmetric boundary conditions. In FIG. 2c, plate 222 is the optical surface, connected to 204 by a via 224, resulting in symmetric boundary conditions of the optical surface.

The mirror and its frame can be tilted up, off of the substrate using materials-based or electrostatic-based self-assembly mechanisms. Electrical interconnects between the substrate and the mirror frame provide power to the mirror.

Conclusion

The optical surface of the mirror is isolated from electrostatic and mechanical forces, so that it does not bend as the mirror is actuated. The mirror and electrodes may be assembled to any angle (it is not limited to frame orientations that are at or nearly parallel to the substrate). The mirror surface can be completely flat and has symmetric boundary conditions because the mirror is connected to a support plate by a via at the center. Wafer-bonding is not required. There are no frictional wear characteristics (aside from the one-time assembly operations).

Although the present invention has been described in accordance with the embodiments shown, one of ordinary skill in the art will readily recognize that there could be variations to the embodiments and those variations would be within the spirit and scope of the present invention. For example, although it is disclosed in the preferred embodiment that the mirror rotates in a first and a second direction, the mirror can rotate or translate in a plurality of directions (i.e. twisting motion) dependent upon the electrostatic forces applied thereto. Accordingly, many modifications may be made by one of ordinary skill in the art without departing from the spirit and scope of the appended claims.

What is claimed is:

1. An optical mirror system comprising:
   a mirror frame;
   an optical surface coupled to the frame;
   an electrostatic shield coupled to the optical surface and the mirror frame;
   a suspension beam assembly coupled between the electrostatic shield and mirror frame; and
   an electrode system for causing the optical surface to be rotated, wherein the electrostatic shield isolates the optical surface from bending due to the electrostatic field created by said electrode system.

2. The system of claim 1 wherein the electrode system comprises at least one primary electrode and at least one secondary electrode.

3. The system of claim 2 wherein the primary electrodes provide for the primary rotation of the system and at least one secondary electrode provides the secondary rotation of the system.

4. The system of claim 3 wherein a via is utilized to couple the optical surface to the shield.

5. The system of claim 4 wherein a suspension beam assembly is utilized to couple the optical surface to the mirror frame.

6. The system of claim 5 wherein the suspension assembly comprises first and second torsion beams.

7. The system of claim 5 wherein the suspension assembly comprises a first pair of oppositely disposed torsion beams and a second pair of oppositely disposed torsion beams.

* * * * *